United States Patent
Wang et al.

(10) Patent No.: US 7,650,431 B2
(45) Date of Patent: Jan. 19, 2010

(54) SERVING LOCALLY RELEVANT ADVERTISEMENTS

(75) Inventors: Lee Wang, Kirkland, WA (US); Wei-Ying Ma, Beijing (CN); Xianfang Wang, Beijing (CN); Xing Xie, Beijing (CN); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 11/467,771

(22) Filed: Aug. 28, 2006

(65) Prior Publication Data

US 2008/0052413 A1    Feb. 28, 2008

(51) Int. Cl.
  *G06F 15/16* (2006.01)
  *G06F 3/00* (2006.01)
(52) U.S. Cl. .................. 709/246; 709/217; 725/42
(58) Field of Classification Search ................ 709/246, 709/217–219; 707/101, 4; 725/42, 43; 705/14
See application file for complete search history.

(56) References Cited

U.S. PATENT DOCUMENTS

| 5,948,040 | A  | * | 9/1999  | DeLorme et al. ............ 701/201 |
| 6,286,002 | B1 |   | 9/2001  | Axaopoulos et al. |
| 6,334,131 | B2 |   | 12/2001 | Chakrabarti et al. |
| 6,338,096 | B1 | * | 1/2002  | Ukelson .................... 719/319 |
| 6,356,899 | B1 |   | 3/2002  | Chakrabarti et al. |
| 6,418,433 | B1 |   | 7/2002  | Chakrabarti et al. |
| 6,505,205 | B1 |   | 1/2003  | Kothuri et al. |
| 6,629,136 | B1 |   | 9/2003  | Naidoo |
| 6,879,980 | B1 |   | 4/2005  | Kothuri et al. |
| 6,885,860 | B2 |   | 4/2005  | Bahl et al. |
| 6,983,311 | B1 | * | 1/2006  | Haitsuka et al. ............ 709/217 |
| 7,089,239 | B1 |   | 8/2006  | Baer et al. |
| 7,158,780 | B2 |   | 1/2007  | Bahl et al. |
| 7,231,405 | B2 | * | 6/2007  | Xia ......................... 707/104.1 |
| 7,257,570 | B2 |   | 8/2007  | Riise et al. |
| 7,257,577 | B2 |   | 8/2007  | Fagin et al. |
| 7,424,472 | B2 |   | 9/2008  | Wang et al. |
| 7,444,343 | B2 |   | 10/2008 | Wang et al. |
| 7,606,875 | B2 |   | 10/2009 | Xie et al. |
| 2001/0013013 | A1 |   | 8/2001  | Takenaga |
| 2002/0059646 | A1 | * | 5/2002  | Kim .......................... 725/139 |
| 2002/0095333 | A1 |   | 7/2002  | Jokinen et al. |
| 2002/0119788 | A1 |   | 8/2002  | Parupudi et al. |
| 2002/0151315 | A1 |   | 10/2002 | Hendrey |
| 2002/0156779 | A1 |   | 10/2002 | Elliott et al. |
| 2002/0169784 | A1 |   | 11/2002 | Cha et al. |

(Continued)

OTHER PUBLICATIONS

"CITY-DATA.COM," http://www.city-data.com [last accessed Feb. 23, 2007].

(Continued)

*Primary Examiner*—Krisna Lim
(74) *Attorney, Agent, or Firm*—Perkins Coie LLP

(57) ABSTRACT

A method and system for providing location-based advertisements to requesting devices is provided. An advertisement system aggregates advertisements by collecting advertisements from multiple advertisement sources, extracting data from the collected advertisements, and storing the extracted data in a common format. After aggregating the advertisements, the advertisement system transforms each advertisement into multiple advertisement formats that are specific to protocols supported by the various device types. When the advertisement system receives queries for advertisements, it identifies matching advertisements and ranks them based on a location. The advertisement system then selects an advertisement format that is appropriate for the requesting device.

20 Claims, 9 Drawing Sheets

U.S. PATENT DOCUMENTS

| | | |
|---|---|---|
| 2002/0188581 A1 | 12/2002 | Fortin et al. |
| 2003/0004938 A1 | 1/2003 | Lawder |
| 2003/0216930 A1 | 11/2003 | Dunham et al. |
| 2004/0204842 A1 | 10/2004 | Shinozaki |
| 2004/0225562 A1 | 11/2004 | Turner |
| 2005/0021403 A1 | 1/2005 | Ozer et al. |
| 2005/0065916 A1 | 3/2005 | Ge et al. |
| 2005/0065959 A1 | 3/2005 | Smith et al. |
| 2005/0085959 A1 | 4/2005 | Feyereisen |
| 2005/0137994 A1 | 6/2005 | Fortin et al. |
| 2005/0177455 A1 | 8/2005 | De Lury et al. |
| 2005/0177554 A1 | 8/2005 | Peltonen et al. |
| 2005/0198014 A1 | 9/2005 | De Lury et al. |
| 2005/0216547 A1 | 9/2005 | Foltz-Smith et al. |
| 2006/0059225 A1 | 3/2006 | Stonehocker et al. |
| 2006/0143266 A1 | 6/2006 | Ohto et al. |
| 2006/0190425 A1 | 8/2006 | Chang et al. |
| 2006/0212350 A1 | 9/2006 | Ellis et al. |
| 2006/0235875 A1* | 10/2006 | Wen et al. ............... 707/103 Y |
| 2006/0271531 A1 | 11/2006 | O'Clair et al. |
| 2006/0282455 A1 | 12/2006 | Lee et al. |
| 2007/0088687 A1* | 4/2007 | Bromm et al. ............... 707/4 |
| 2007/0168465 A1 | 7/2007 | Toppenberg et al. |
| 2007/0192164 A1* | 8/2007 | Nong et al. ............... 705/10 |
| 2007/0233864 A1 | 10/2007 | Xie et al. |
| 2007/0288437 A1 | 12/2007 | Xia |
| 2008/0052151 A1 | 2/2008 | Xie et al. |
| 2008/0134042 A1 | 6/2008 | Jankovich |
| 2009/0019066 A1 | 1/2009 | Wang et al. |

OTHER PUBLICATIONS

"Geographic Names Information System (GNIS)," http://geonames.usgs.gov/, [last accessed Feb. 23, 2007].

"Google Local Search," http://www.google.com/local, [last accessed Feb. 23, 2007].

"MSN Local Search and Microsoft MapPoint," http://mappoint.msn.com, [last accessed Feb. 23, 2006].

"North American Numbering Plan," http://sd.wareonearth.com/~phil/npanxx, [last accessed Feb. 23, 2007].

"Open Directory Project," http://dmoz.org/, [last accessed Feb. 23, 2007].

"SPIRIT project," http://www.geo-spirit.org, [last accessed Feb. 23, 2006].

"USPS—The United States Postal Services," http://www.usps.com, [last accessed Feb. 23, 2007].

"Yahoo Directory," http://dir.yahoo.com/, [last accessed Feb. 13, 2007].

"Yahoo Local," http://local.yahoo.com, [last accessed Feb. 26, 2007].

"Yahoo Regional," http://www.yahoo.com/regional, [last accessed Feb. 13, 2007].

Amitay, Einat et al., "Web-a-where: Geotagging Web Content," SIGIR'04, Sheffield, South Yorkshire, UK, © 2004 ACM, pp. 273-280.

Beckmann, Norbert et al., "The R-tree: An Efficient and Robust Access Method for Points and Rectangles," Proceedings of the 1990 ACM SIGMOD International Conference on Management of Data, Atlantic City, New Jersey, © 1990 ACM, pp. 322-331.

Brin, Sergey and Lawrence Page, "The Anatomy of a Large-Scale Hypertextual Web Search Engine," 7th WWW, Apr. 1998, 20 pages.

Burges, Christopher J.C., "A Tutorial on Support Vector Machines for Pattern Recognition," Data Mining and Knowledge Discovery, 2, 1998, © 1998 Kluwer Academic Publishers, pp. 121-167.

Buyukkokten, Orkut et al., "Exploiting Geographical Location Information of Web Pages," Proceedings of the ACM SIGMOD Workshop on the Web and Databases, Jun. 1999, pp. 91-96.

Chakrabarti, Soumen et al., "Enhanced hypertext categorization using hyperlinks," ACM SIGMOD 1998, Seattle, Washington, 12 pages.

Davison, Brian D., "Topical Locality in the Web: Experiments and Observations," Jul. 2000, Technical Report DCS-TR-414, Department of Computer Science, Rutgers University, pp. 1-22.

Ding, Junyan et al., "Computing Geographical Scopes of Web Resources," Proceedings of the 26th VLDB Conference, Cairo, Egypt, 2000, pp. 545-556.

Dumais, Susan and Hao Chew, "Hierarchical Classification of Web Content," SIGIR 2000, Athens, Greece, © 2000 ACM, pp. 256-263.

Glover, Eric J. et al., "Using Web Structure for Classifying and Describing Web Pages," WWW2002, May 2002, Honolulu, Hawaii, ACM, pp. 562-569.

Gravano, Luis et al., "Categorizing Web Queries According to Geographical Locality," CIKM'03, Nov. 2003, New Orleans, Louisiana, © 2003 ACM, 9 pages.

Gravano, Luis, "GeoSearch: A Geographically-Aware Search Engine," http://geosearch.cs.columbia.edu, [last accessed Feb. 23, 2007].

Guttman, Antonin, "R-Trees: A Dynamic Index Structure for Spatial Searching," © 1984 ACM, pp. 47-57.

Hearst, Marti A., "Trends & Controversies—Support vector machines," IEEE Intelligent Systems, Jul./Aug. 1998, pp. 18-28.

Hill, Linda L. et al., "Geographic Names," D-Lib Magazine, Jan. 1999, vol. 5, Issue 1, 17 pages.

International Search Report, PCT/US2007/005393, Microsoft Corporation, Mailing Date: Aug. 29, 2007, 4 pages.

International Search Report, PCT/US2007/076909, Microsoft Corporation, Mailing Date: Jan. 31, 2008, 3 pages.

Jones, Matt et al., "Using a Mobile Device to Vary the Pace of Search," Human-Computer Interaction with Mobile Devices and Services, Mobile HCI 2003, Udine, Italy, 2003, © Springer-Verlag Berlin Heidelberg 2003, pp. 390-394.

Kaasinen, Eija, "User needs for location-aware mobile services," Pers Ubiquit Comput, 2003, vol. 7, © Springer-Verlag London Limited 2003, pp. 70-79.

Kosala, Raymond and Hendrik Blockeel, "Web Mining Research: A Survey," SIGKDD Explorations, Jul. 2000, vol. 2, Issue 1, © 2000 ACM SIGKDD, pp. 1-15.

Larson, Ray R., "Geographic Information Retrieval and Spatial Browsing," In GIS and Libraries: Patrons, Maps and Spatial Information, Linda Smith and Myke Gluck, Eds., University of Illinois, 1996, pp. 81-124, available online at http://sherlock.berkeley.edu/geo_ir/PART1.html.

Lee, Fiona et al., "Global Atlas: Calibrating and Indexing Documents from the Internet in the Cartographic Paradigm," 1st International Conference on Web Information Systems Engineering, IEEE Computer Society 2000, Hong Kong, China, © 2000 IEEE, pp. 125-132.

Lee, R. et al., "Optimization of Geographic Area to a Web Page for Two-Dimensional Range Query Processing," 4th International Conference on Web Information Systems Engineering Workshops, Roma, Italy, 2003, © 2004 IEEE, pp. 9-17.

Leutenegger, Scott T. et al., "STR: A Simple and Efficient Algorithm for R-Tree Packing," 13th International Conference on Data Engineering, IEEE Computer Society 1997, Birmingham U.K., pp. 497-506.

Ma, Qiang and Katsumi Tanaka, "Retrieving Regional Information from Web by Contents Localness and User Location," AIRS 2004, LNCS 3411, 2005, © Springer-Verlag Berlin Heidelberg 2005, pp. 301-312.

Ma, Qiang et al., "A Localness-Filter for Searched Web Pages," APWeb 2003, LNCS 2642, © Springer-Verlag Berlin Heidelberg 2003, pp. 525-536.

Markowetz, Alexander et al., "Design and Implementation of a Geographic Search Engine," 8th International Workshop on the Web and Databases, Jun. 2005, Baltimore, Maryland, 6 pages.

McCurley, Kevin S., "Geospatial Mapping and Navigation of the Web," WWW10, May 2001, Hong Kong, ACM, pp. 221-229.

Platt, John C., "Fast Training of Support Vector Machines using Sequential Minimal Optimization," Chapter 12, Advances in Kernel Methods—Support Vector Learning, B. Schölkopf, C. Burges, and A. Smola, eds., MIT Press, 1999, pp. 185-208.

Pramudiono, Iko et al., "User Behavior Analysis of Location Aware Search Engine," 3rd International Conference on Mobile Data Management, Singapore, Jan. 2002, 7 pages.

Sanderson, Mark and Janet Kohler, "Analyzing geographic queries," In Proceedings of SIGIR 2004, Workshop on Geographic Information Retrieval, ACM Press, Sheffield, UK, 2004, 2 pages.

Song, Ruihua et al., "Learning Block Importance Models for Web Pages," WWW 2004, May, New York, ACM, 9 pages.

Sterling, Greg, "Search Engine Watch—Local Search: The Hybrid Future," Jan. 8, 2004, http://searchenginewatch.com/searchday/article.php/3296721, [last accessed Feb. 23, 2007].

Theodoridis, Yannis et al., "Efficient Cost Models for Spatial Queries Using R-Trees," IEEE Transactions on Knowledge and Data Engineering, vol. 12, No. 1, Jan./Feb. 2000, © 2000 IEEE, pp. 19-32.

Vaid, Subodh and Christopher B. Jones, "Spatially Indexing Text Documents," Report on Spatial Indexing Methods, Technical Report D12 2201, SPIRIT project, 2004, 37 pages.

Wang, Chuang et al., "Detecting Geographic Locations from Web Resources," GIR'05, Nov. 2005, Bremen, Germany, © 2005 ACM, pp. 17-24.

Wang, Chuang et al., "Web Resource Geographic Location Classification and Detection," WWW 2005, May 2005, Chiba, Japan, ACM, pp. 1138-1139.

Wang, Lee et al., "Detecting Dominant Locations from Search Queries," SIGIR'05, Aug. 2005, Salvador, Brazil, © 2005 ACM, 8 pages.

Yang, Yiming et al., "A Study of Approaches to Hypertext Categorization," Journal of Intelligent Information Systems, © Kluwer Academic Publishers, Boston, pp. 1-25.

Yokoji, Seiji et al., "Kokono Search: A Location Based Search Engine," WWW 10, Hong Kong, May 2001, 2 pages.

* cited by examiner

SERVING LOCALLY RELEVANT ADVERTISEMENTS

BACKGROUND

Many users interact with various Internet-based services using mobile devices such as personal digital assistants ("PDAs") and cell phones. Common Internet-based services include map services, navigation services, and search services. A map service, which may be provided as a web service, provides maps of various locations as requested by users. For example, a user driving a vehicle may request using a cell phone that the map service provide a map of the surrounding area. The map service may determine the user's current location based on global positioning system ("GPS") coordinates provided by the cell phone and download a map of the surrounding area to the cell phone so that it can be displayed to the user. The map service may provide maps based on locations other than the user's current location. For example, a user may use a map service when planning a vacation in a distant city. In such a case, the map service provides a map of the distant city. The map service may be accessible by any computing device (e.g., a desktop computer) and not just mobile devices.

A navigation service provides directions for travel between locations. For example, a user driving a vehicle may use a PDA to specify a destination location and request the navigation service to provide directions from their current location to the destination location. The navigation service, after determining the user's current location (e.g., using GPS information), prepares the directions and downloads the directions to the user's PDA for presentation to the user. The directions may be in various formats. For example, the directions may be presented by highlighting a map or by providing a written or an audible list of turn instructions.

A search service may allow users to search for enterprises (e.g., retail outlets, governmental entities, and schools) that satisfy a search request or query. For example, a user driving a vehicle may use a PDA to request a search service to identify the restaurants that are nearby. The user may enter the query "nearby restaurants." The search service would identify restaurants that are near the user's current location and provide to the user's PDA a listing of those restaurants or a map indicating the locations of the restaurants.

Many Internet-based services, such as map services, navigation services, and search services, rely on advertising revenue as their sole source of revenue or to augment other sources of revenue. When a service receives a request, the service may provide advertisements along with the response to the request. A navigation service may provide advertisements that are in some way related to the destination location. For example, if the destination location is Washington, D.C., then the navigation service may provide advertisements for tour companies, restaurants, airlines, and so on that service Washington, D.C. A map service may similarly provide advertisements that are in some way related to the area of the map being displayed, and a search service may provide advertisements related to the search terms and the user's current location.

A difficulty, however, with providing advertisements that are in some way related to a location is that the advertisements are oftentimes ranked based on distance from the advertised service to the user's current location. For example, if a user in Seattle enters "nearby restaurants," a search service may identify advertisements for coffee outlets, fast-food outlets, and full-service restaurants that are within a five-mile radius of the user's current location. The search service may rank eight coffee outlets first because they are nearest to the user (e.g., within one mile of the user) and rank a coffee outlet that is two miles away higher than a restaurant that is three miles away. The user, however, is unlikely to be interested in a coffee outlet that is two miles away, but is likely to be interested in a restaurant that is three miles away. In such a case, the ranking based on distance would not necessarily reflect a correct ranking from the user's perspective.

Many of these Internet-based services may rely on an advertising service to provided advertisements. An advertising service typically has a database of advertisements that have been provided by its advertisers. Thus, the Internet-based service is limited to the advertisements provided by the advertising service. There are, however, many other potential sources of information for advertising businesses. For example, a business may place an advertisement in an electronic version of Yellow Pages, a chamber of commerce may provide an electronic listing of local businesses, and so on. Typically, Internet-based services cannot tap into these various sources of business information to support placement of advertisements.

Many of these Internet-based services also only support World Wide Web protocols and are thus limited to the types of devices for which they can provide advertisements. For example, a cell phone that does not support the HTML protocol or the HTTP protocol cannot display advertisements based on those protocols. Moreover, even if a device does support the protocols of the Internet-based service, the advertisements may not be appropriate for the device. For example, if the device has a very small display, then an advertisement designed for a large display would likely not be effective when presented on the small display.

SUMMARY

A method and system for providing location-based advertisements to requesting devices is provided. An advertisement system aggregates advertisements by collecting advertisements from multiple advertisement sources, extracting data from the collected advertisements, and storing the extracted data in a common format. The advertisement system may also identify the "serving areas" of the advertisements. After aggregating the advertisements, the advertisement system transforms each advertisement into multiple advertisement formats that are specific to protocols supported by the various device types. When the advertisement system receives queries for advertisements, it searches for advertisements that match the query. After identifying matching advertisements as candidate advertisements, the advertisement system ranks the candidate advertisements based on a location associated with a query and a location associated with the advertisement. The advertisement system then selects an advertisement format that is appropriate for the requesting device for each of the highly ranked advertisements and provides those advertisements in response to the request for advertisements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
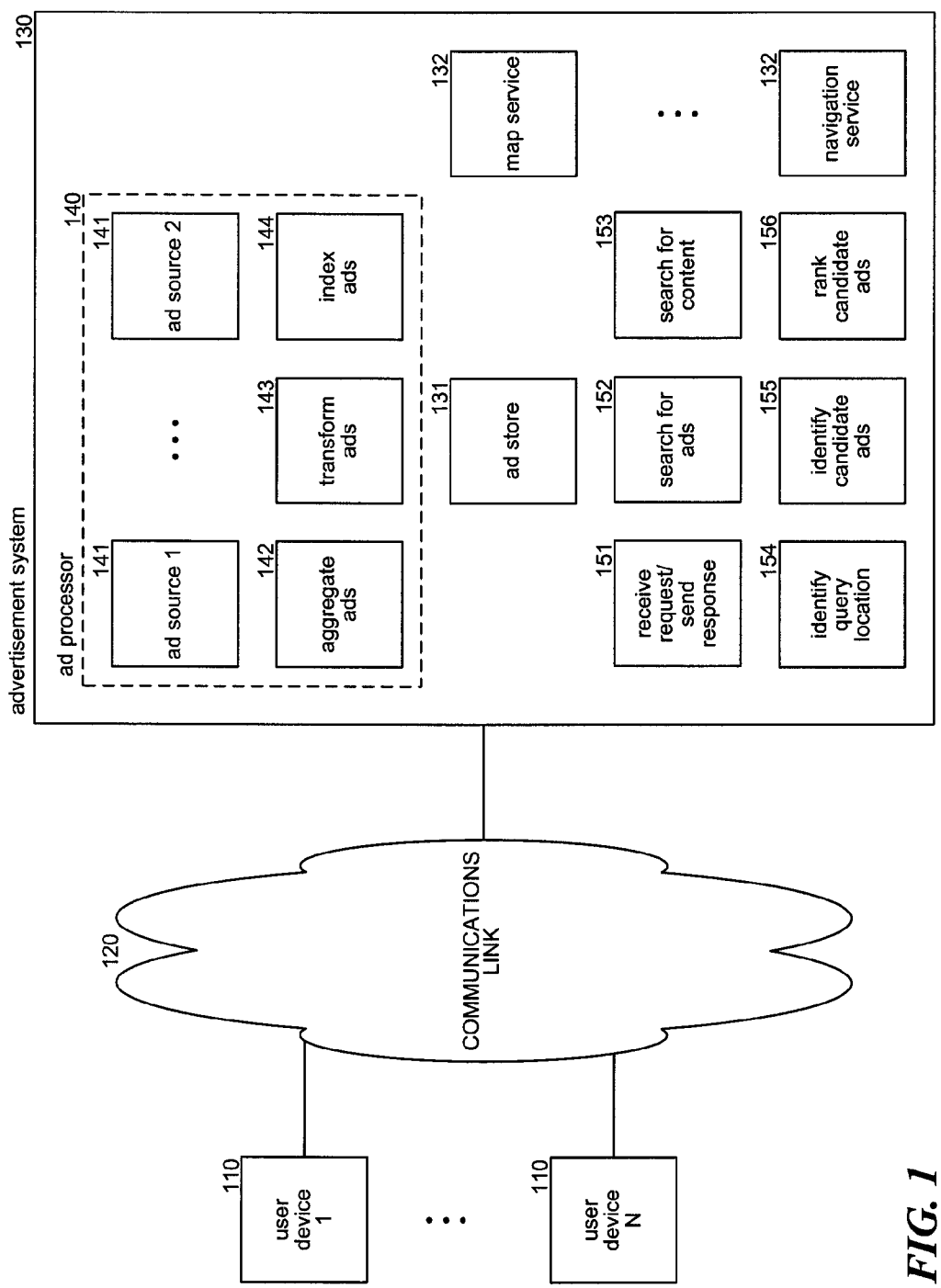
FIG. 1 is a block diagram that illustrates components of the advertisement system in one embodiment.

A method and system for providing location-based advertisements to requesting devices is provided. In one embodiment, an advertisement system aggregates advertisements by collecting advertisements from multiple advertisement sources. For example, the advertisement system may collect advertisements from pay-for-click advertisement systems, advertisements from electronic Yellow Pages, and advertisements generated from electronic business listings. The advertisement system extracts data from the collected advertisements and stores the extracted data in a common format. For example, the advertisement system may extract data that includes business name, business location, keywords, and business category. The advertisement system may also identify the "serving areas" of the advertisements. The serving area represents the geographic area from which the business being advertised is likely to draw customers. For example, the serving area of an advertisement for a coffee outlet may have a three-block radius centered at the coffee outlet while the serving area for a car dealership may have a 50-mile radius. The advertisement system may determine the serving area in various ways, such as from explicit metadata associated with advertisements or analyzing the content of the advertisements. After aggregating the advertisements, the advertisement system transforms each advertisement into multiple advertisement formats that are specific to protocols supported by the various device types. For example, the advertisement system may transform an advertisement to formats for devices that support the Short Message Service ("SMS") protocol or the Wireless Application Protocol ("WAP"). When the advertisement system receives queries for advertisements, it searches for advertisements that match the query. A query may be submitted by a user of a device to a content service (e.g., map service) to search for content. The content service may in turn submit that query to the advertisement system to identify advertisements that match the query. After identifying matching advertisements as candidate advertisements, the advertisement system ranks the candidate advertisements based on a location associated with a query and a location associated with the advertisement. The location associated with the query may be the user's current location represented by the location of the device or a query location derived from the query itself. For example, the advertisement system may rank the advertisements whose serving areas encompass the user's current location or query location higher than those that do not. The advertisement system then selects an advertisement format that is appropriate for the requesting device for each of the highly ranked advertisements and provides those advertisements in response to the request for advertisements.

In one embodiment, the advertisement system selects advertisements to display to a user based on the serving area of the advertisements. An example system for selecting advertisements based on serving area is described in U.S. application Ser. No. 11/467,810 filed on Aug. 28, 2006, entitled "Selecting Advertisements Based on Serving Area and Map Area", which is hereby incorporated by reference. The advertisement system may establish the serving area of an advertisement when it aggregates advertisements from the various advertisement sources. The advertisement system may initially identify candidate advertisements to be provided to a user and then filter those advertisements based on serving area. The advertisement search system searches for advertisements that are related to the submitted query. The advertisement system considers the related advertisements to be candidate advertisements. The advertisement system may select only those candidate advertisements whose serving areas encompass the user's current location. For example, if the serving area of a small coffee outlet is two blocks and the serving area of a larger coffee outlet is five blocks and the user is located three blocks from the small coffee outlet and four blocks from the larger coffee outlet, the advertisement system would select the advertisement for the larger coffee outlet, but not the advertisement for the smaller coffee outlet even though the smaller coffee outlet is closer to the user. Alternatively, the advertisement system may use the serving area to rank advertisements whose serving areas encompass the users current location higher than advertisements whose serving areas do not. The advertisement system may rank those advertisements whose serving areas do not encompass the user's current location based on distance from the user's current location to their serving areas.

In one embodiment, the advertisement system selects advertisements to present to a user based on a map area currently being displayed to the user. An example system for selecting advertisements based on map area is described in U.S. application Ser. No. 11/467,810 filed on Aug. 28, 2006, entitled "Selecting Advertisements Based on Serving Area and Map Area", which is hereby incorporated by reference. The advertisement system may initially identify candidate advertisements to be provided to a user and then filter those advertisements based on "provider location." The advertisement system may determine the provider location of an advertisement, which represents the physical location at which a service advertised by an advertisement is provided. As examples, the provider location of an advertisement for a coffee outlet is the location of the outlet and for a bank may be a local branch office. The advertisement system may determine the provider location in various ways, such as from explicit metadata associated with the advertisements or analyzing the content of the advertisements. The advertisement system may establish the provider location of an advertisement when it aggregates advertisements from the various advertisement sources. The advertisement system selects those candidate advertisements whose provider locations are within or encompassed by the map area that is currently being displayed to the user.

In one embodiment, an advertisement system performs a location-based search for advertisements using a hybrid index that indexes both location and keyword attributes of the advertisements. An example of a hybrid index is described in U.S. application Ser. No. 11/278,301 filed on Mar. 31, 2006, now U.S. Pat. No. 7,444,343 issued on Oct. 28, 2008, entitled "Hybrid Location and Keyword Index," which is hereby incorporated by reference. The advertisement system generates the hybrid index using either a location attribute as the primary index or a keyword attribute as the primary index. When the location attribute is the primary index, the keyword attribute is the secondary index, and vice versa. To generate the hybrid index, the advertisement system identifies the values for the keyword and location attributes of each advertisement. The advertisement system may map location names derived from the advertisements to vector-based locations, which are used for indexing. The advertisement system may represent each mapped-to location as a rectangular area identified by coordinates of its diagonal corners. The advertisement system generates the primary index to map each value of a first attribute to a secondary index. The advertisement system thus generates, for each value of the first attribute, a secondary index to map values of a second attribute to advertisements that have the associated values of the first and second attributes. The advertisement system then uses the hybrid index to perform location-based searching. A location-based query includes a query term and a location, which may be derived from the query terms. To identify advertisements, the advertisement system searches the primary index using the query value for the first attribute to locate the associated secondary index. The advertisement system then searches the associated secondary index for the query value of the second attribute to identify the advertisements associated with both the query values of the first attribute and the second attribute. The advertisement system then returns the identified advertisements as candidate advertisements.

The advertisement system may include or interact with systems that determine the provider locations and serving areas of advertisements. Various techniques for determining provider locations and serving areas are described in U.S. patent application Ser. No. 11/081,014 filed on Mar. 10, 2005, now U.S. Pat. No. 7,574,530 issued on Aug. 11, 2009, entitled "Method and System for Web Resource Location Classification and Detection," and U.S. patent application Ser. No. 11/277,704 filed on Mar. 28, 2006, now U.S. Pat. No. 7,606,875 issued on Oct. 20, 2009, entitled "Detecting Serving Area of a Web Resource," which are both hereby incorporated by reference. For example, the advertisement system may interact with a location system that determines the serving area of a web resource (e.g., web site of the business being advertised) based on addresses (e.g., IP addresses) of users who access the web resource. The location system may identify the accesses to a web resource by analyzing web access information such as web access logs, click-through logs, and so on. A web access log may be generated by a web site and may contain an entry for each access by a user to the web site. Each entry may include the IP address of the user. A click-through log may be generated by a search engine and may contain an entry for each selection of a reference to the web site that is included in a query result, commonly referred to as a "click-through." The location system retrieves the P addresses from the web access information and then determines the geographic locations associated with the IP addresses. Many commercial products are available that provide mappings from IP addresses to geographic locations, such as IP2Location by Hexasoft Development and GeoPoint by Quova Corp. After the location system identifies the locations of each user access to the web site, it analyzes the identified locations to determine the serving area of the web resource. The location system may use a hierarchy of locations such as one organized by continent, country, state, and city. The location system may select locations for the serving area based on the number of accesses of the web resource by users within the location and based on a distribution of the number of accesses of the web resource by users within locations that are hierarchically within the location. The location system may alternatively determine serving area based on the provider location and business category. Each business category may have a different serving radius. For example, the serving radius of a coffee outlet category may be three blocks and of a car dealership may be 50 miles. The serving area may cover a circular area extending from the provider location to the serving radius.

FIG. 1 is a block diagram that illustrates components of the advertisement system in one embodiment. The advertisement system 130 is connected to user devices 110 via communications link 120, which may be a wireless network. The advertisement system includes an advertisement processor 140 that preprocesses advertisements. The advertisement processor may interface with various advertisement sources 141. The advertisement processor includes an aggregate advertisements component 142, a transform advertisements component 143, and an index advertisements component 144. The aggregate advertisements component collects advertisements from the advertisement sources, extracts data from the collected advertisements, and stores the extracted data of the advertisements in a common format. The transform advertisements component transforms the extracted data of advertisements into multiple advertisement formats that are specific to various protocols or device types. The index advertisements component generates a hybrid index based on location and keyword. One skilled in the art will appreciate that other indexing techniques may be used such as indexing only on location or indexing only on keyword. In addition, the generated index may be stored using a variety of data structures such as hash tables, link lists, tree data structures, and so on. The advertisement system also includes an advertisement store 131 that contains the aggregated, transformed, and indexed advertisements. The advertisement system may interface with various content services 132, such as a map service or a navigation service, to provide content requested by a user. The content services may be implemented on the same computer system as the advertisement system or on a separate computer system. The advertisement system includes a receive request/send response component 151, a search for advertisements component 152, a search for content component 153, an identify query location component 154, an identify candidate advertisements component 155, and a rank candidate advertisements component 156. The receive request/send response component receives queries for content, searches for content that matches the query by invoking a content service, searches for advertisements that match the query by invoking the search for advertisements component, and sends a response to that query that includes both content and advertisements. The search for advertisements component invokes the identify query location component to identify a query location for the query, invokes the identify candidate advertisements component to identify candidate advertisements, and invokes the rank candidate advertisements component to rank the candidate advertisements based on location.

The computing device on which the advertisement system is implemented may include a central processing unit, memory, input devices (e.g., keyboard and pointing devices), output devices (e.g., display devices), and storage devices (e.g., disk drives). The memory and storage devices are computer-readable media (with each memory and storage device being a computer-readable medium) that may contain instructions that implement the advertisement system. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the advertisement system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computing devices that interact with the advertisement system may be cell phones, personal digital assistants, smart phones, personal computers, programmable consumer electronics, digital cameras, and so on.

The advertisement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the advertisement system may be implemented on a computer system separate from the map service, the navigation service, or other services for which it provide advertisements.

Figure 2:
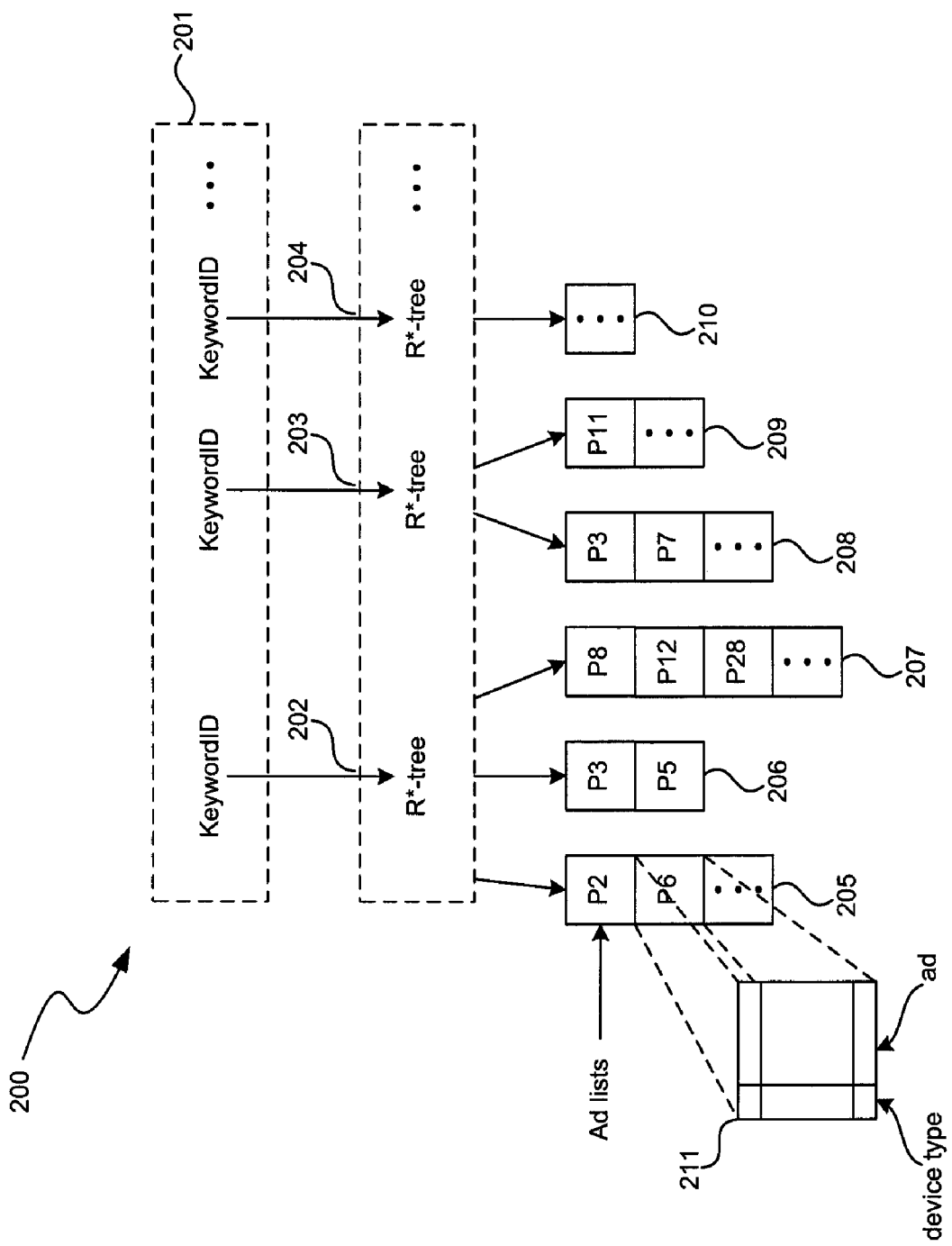
FIG. 2 is a block diagram that illustrates a hybrid index with a keyword index as the primary index in one embodiment.

FIG. 2 is a block diagram that illustrates a hybrid index with a keyword index as the primary index in one embodiment. A hybrid index 200 includes a keyword index 201 with an entry for each keyword. Each entry for a keyword includes a reference to a location index 202-204. In one embodiment, the advertisement system implements the location indexes using an R*-tree data structure. The advertisement system may alternatively use other types of data structures such as an R-tree data structure, a B+-tree data structure, a hash-based data structure, and so on. An R*-tree data structure is described in Beckman, N., Kriegel, H., Schneider, R., and Seeger, B., "The R*-tree: An Efficient and Robust Access Method for Points and Rectangles," ACM, May 1990, pp. 322-331, which is hereby incorporated by reference. The advertisement system may implement a keyword index as an inverted file data structure such as a hash table, a prefix table, and so on. Each location index has an entry for each location for which at least one advertisement has the corresponding keyword. Each entry (i.e., leaf node) has a reference to the corresponding advertisements. In this example, location index 202 has entries that point to advertisement lists 205-207, location index 203 has entries that point to advertisement lists 208-209, and location index 204 has an entry that points to advertisement list 210. Each advertisement may have an associated advertisement format table 211 that identifies the advertisement format for various protocols. For example, the advertisement format for the SMS protocol may include the name of a business and its telephone number, and the advertisement format for the XML protocol may include the name of the business and its address and logo.

Figure 3:
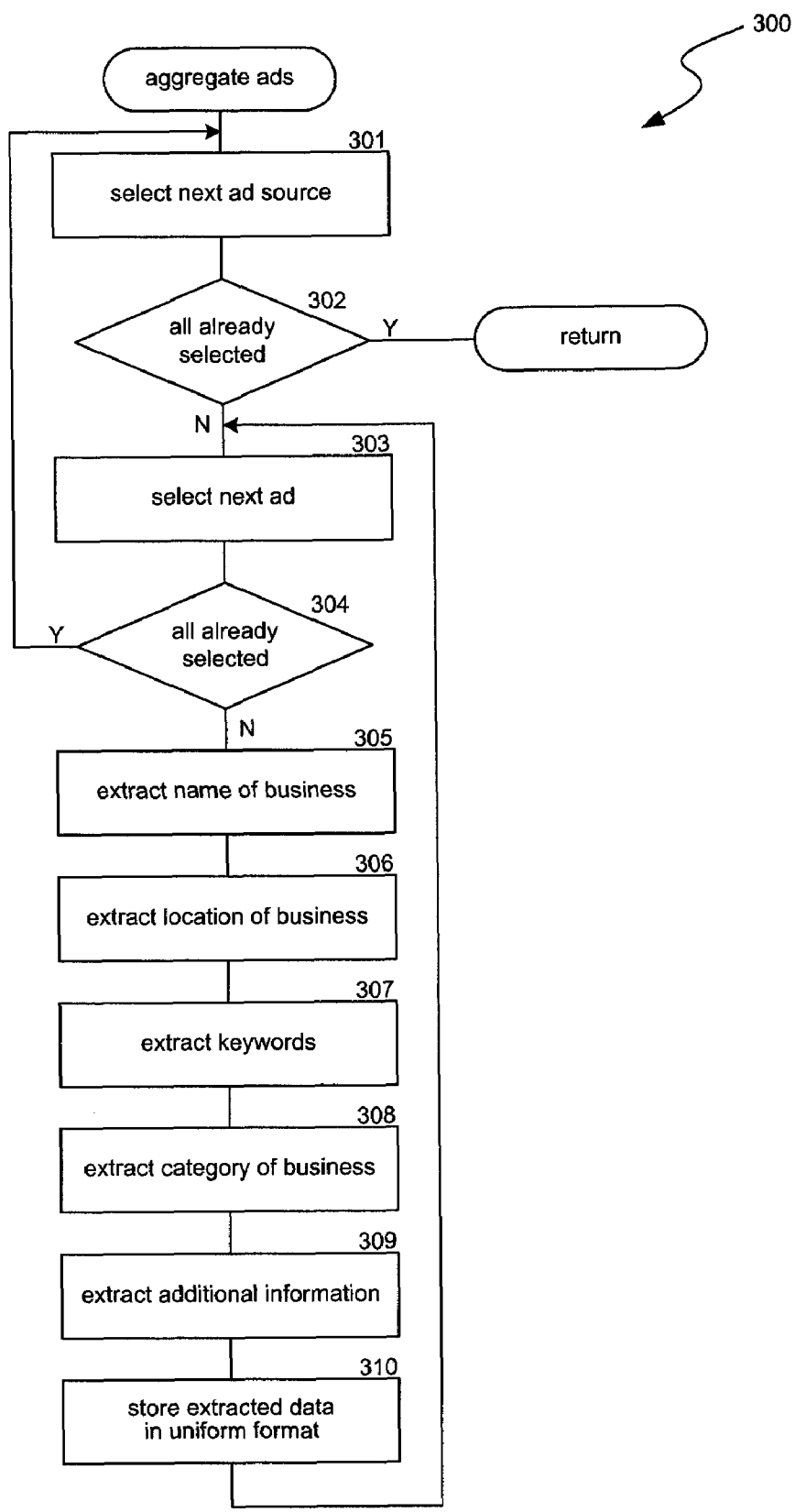
FIG. 3 is a flow diagram that illustrates the processing of the aggregate advertisements component of the advertisement system in one embodiment.

FIG. 3 is a flow diagram that illustrates the processing of the aggregate advertisements component of the advertisement system in one embodiment. The component 300 collects advertisements, extracts data from the advertisements, and stores the data in a common format. In block 301, the component selects the next advertisement source. In decision block 302, if all the advertisement sources have already been selected, then the component returns, else the component continues at block 303. In block 303, the component selects the next advertisement for the selected advertisement source. In decision block 304, if all the advertisements have already been selected, then the component loops to block 301 to select the next advertisement source, else the component continues at block 305. In block 305, the component extracts the name of the business from the selected advertisement. In block 306, the component extracts the location of the business from the selected advertisement. In block 307, the component extracts keywords from the selected advertisement. In block 308, the component extracts the category of the business of the selected advertisement. In block 309, the component extracts additional information from the selected advertisement, such as telephone number, logo, and URL. In block 310, the component stores the extracted data in a uniform format and then loops to block 303 to select the next advertisement.

Figure 4:
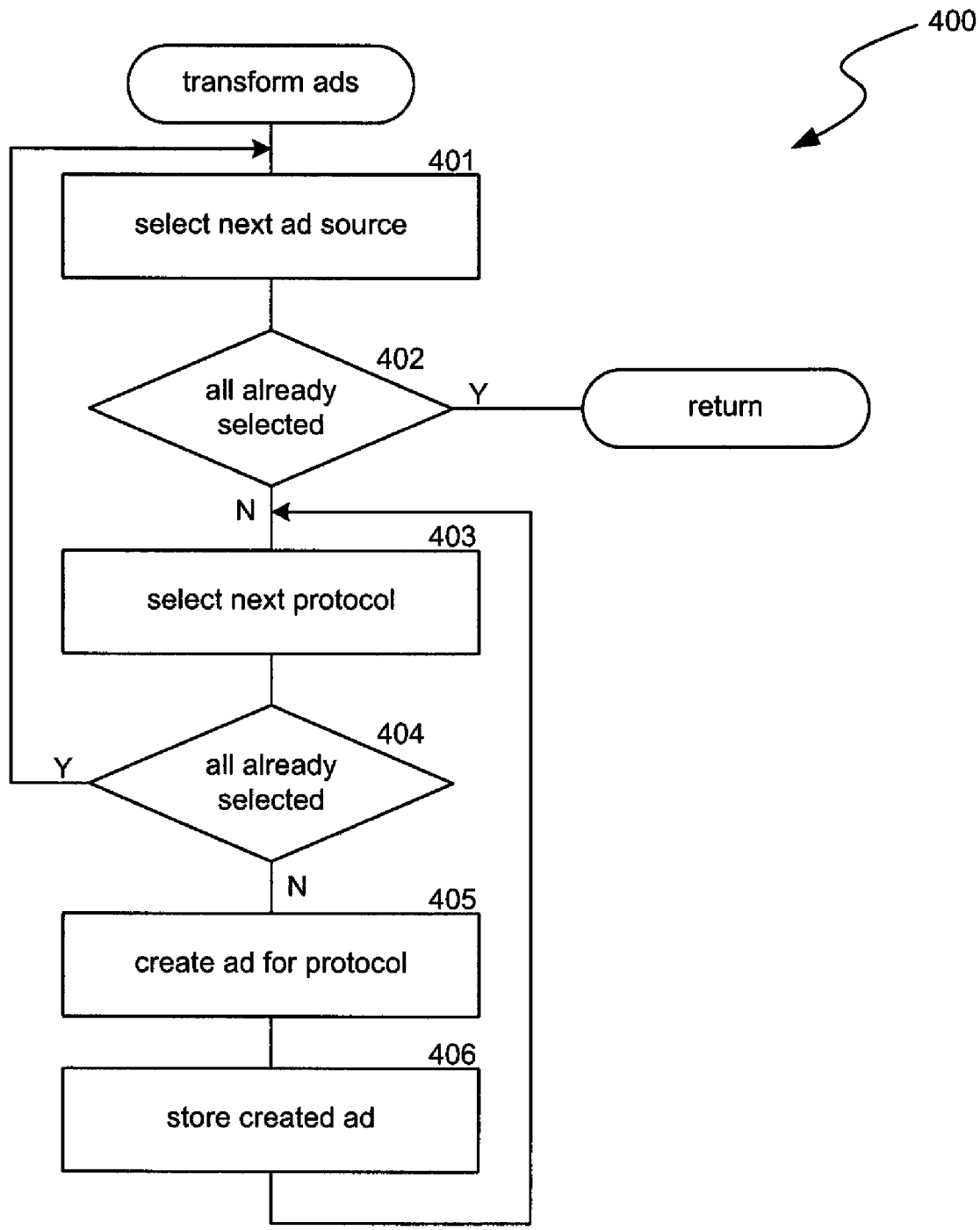
FIG. 4 is a flow diagram that illustrates the processing of the transform advertisements component of the advertisement system in one embodiment.

FIG. 4 is a flow diagram that illustrates the processing of the transform advertisements component of the advertisement system in one embodiment. The component 400 transforms advertisements into various advertisement formats based on supported protocols such as the Multimedia Messaging Service ("MMS") protocol, the Hypertext Markup Language ("HTML") protocol, the extensible Markup Language ("XML") protocol, the Short Message Service ("SMS") protocol, the Wireless Application Protocol ("WAP"), and so on. In block 401, the component selects the next advertisement. In decision block 402, if all the advertisements have already been selected, then the component returns, else the component continues at block 403. In block 403, the component selects the next protocol. In decision block 404, if all the protocols for the selected advertisement have already been selected, then the component loops to block 401 to select the next advertisement, else the component continues at block 405. In block 405, the component creates an advertisement for the protocol. In block 406, the component stores the created advertisement format in the advertisement store and then loops to block 403 to select the next protocol.

Figure 5:
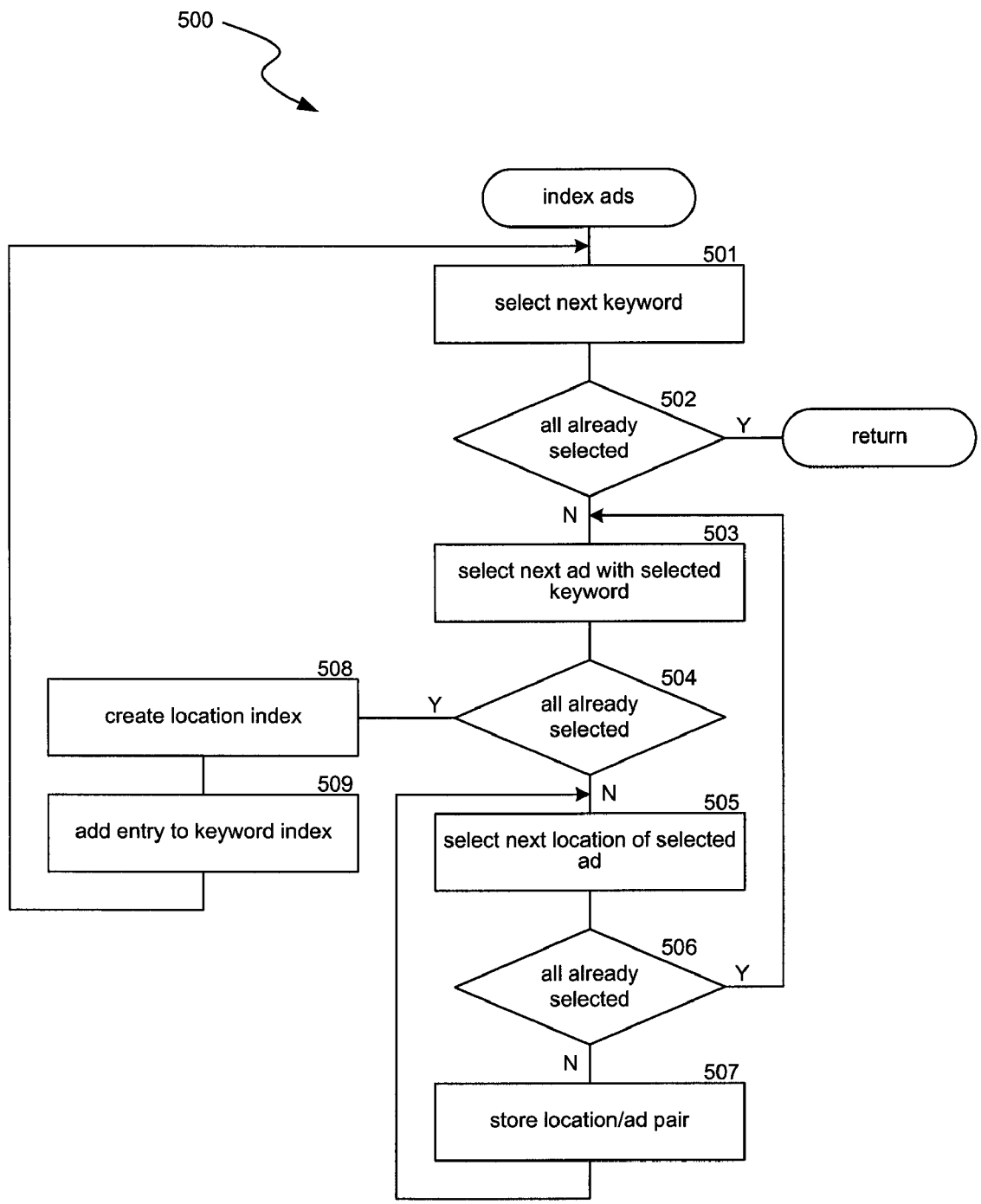
FIG. 5 is a flow diagram that illustrates the processing of the index advertisements component of the advertisement system in one embodiment.

FIG. 5 is a flow diagram that illustrates the processing of the index advertisements component of the advertisement system in one embodiment. The component 500 generates a hybrid index for the advertisements using keywords as the primary index. In blocks 501-509, the component loops selecting keywords identified by the indexer and adding entries to the keyword index. In block 501, the component selects the next keyword. In decision block 502, if all the keywords have already been selected, then the component returns, else the component continues at block 503. In blocks 503-507, the component loops populating the location index for the selected keyword. In block 503, the component selects the next advertisement that is associated with the selected keyword. In decision block 504, if all the advertisements have already been selected, then the component continues at block 508, else the component continues at block 505. In blocks 505-507, the component loops identifying the locations associated with the selected advertisement. In block 505, the component selects the next location of the selected advertisement. In decision block 506, if all the locations have already been selected, then the component loops to block 503 to select the next advertisement, else the component continues at block 507. In block 507, the component stores a location and advertisement pair for use when creating the location index and loops to block 505 to select the next location. In block 508, the component creates a location index using the location and advertisement pairs stored in block 507. In block 509, the component adds an entry to the keyword index for the selected keyword that contains a reference to the created location index. The component then loops to block 501 to select the next keyword.

Figure 6:
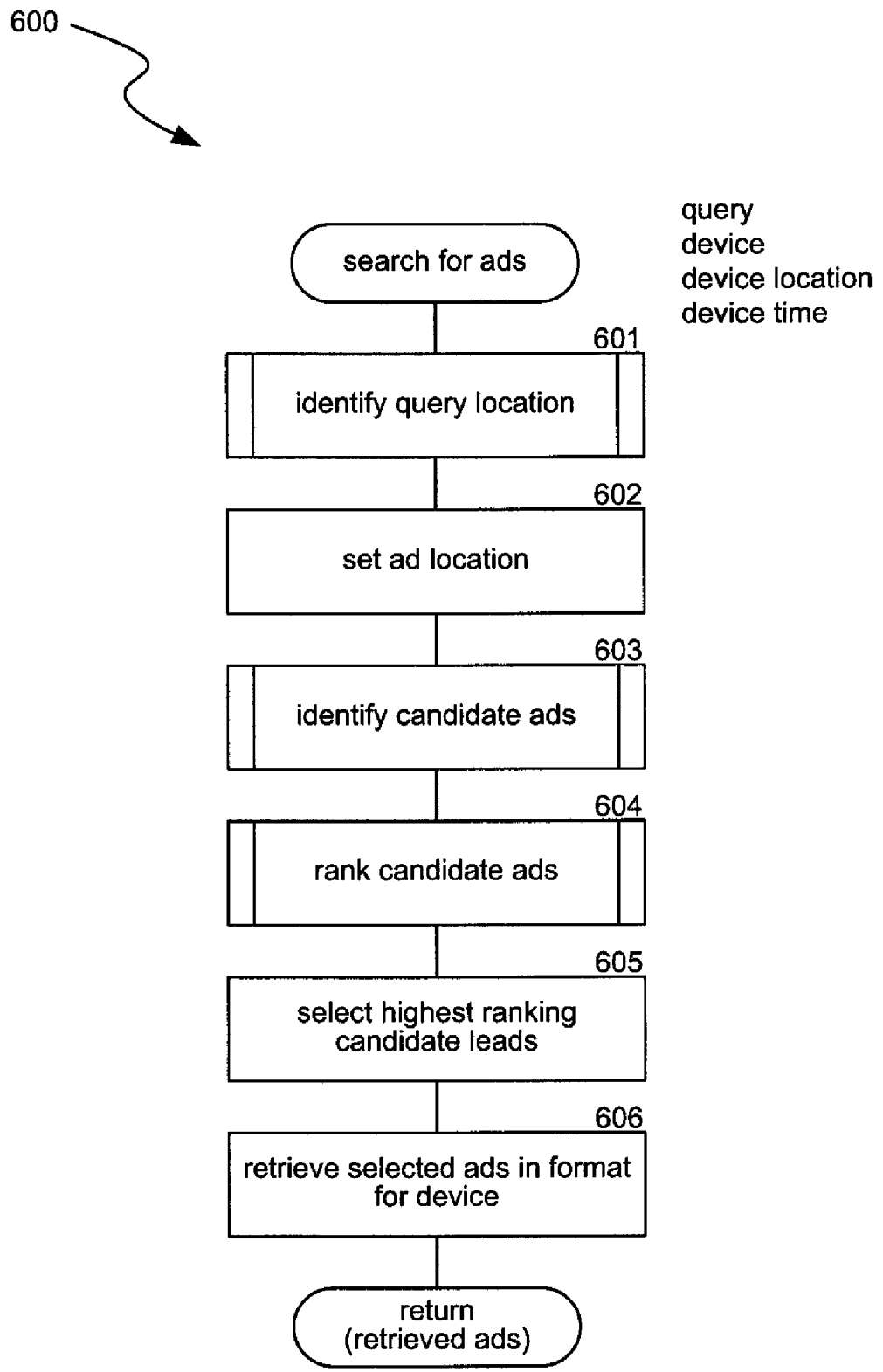
FIG. 6 is a flow diagram that illustrates the processing of the search for advertisements component of the advertisement system in one embodiment.

FIG. 6 is a flow diagram that illustrates the processing of the search for advertisements component of the advertisement system in one embodiment. The component 600 is passed a query, an indication of the requesting device, an indication of the device location, and a device time. The device time may be used to filter out advertisements for businesses that are currently closed. The component searches for and identifies advertisements that are relevant to the query. In block 601, the component invokes the identify query location component to identify query locations associated with the query. In block 602, the component sets an advertisement location. The location for the advertisement may be set to one or more query locations or to the device location. In block 603, the component invokes the identify candidate advertisements component to identify candidate advertisements that match the query. In block 604, the component invokes the rank candidate advertisements component to rank the candidate advertisements based on location. In block 605, the component selects the highest-ranking candidate advertisements. In block 606, the component retrieves the appropriate advertisement formats of the selected advertisements for the requesting device. The component then returns the retrieved advertisements.

Figure 7:
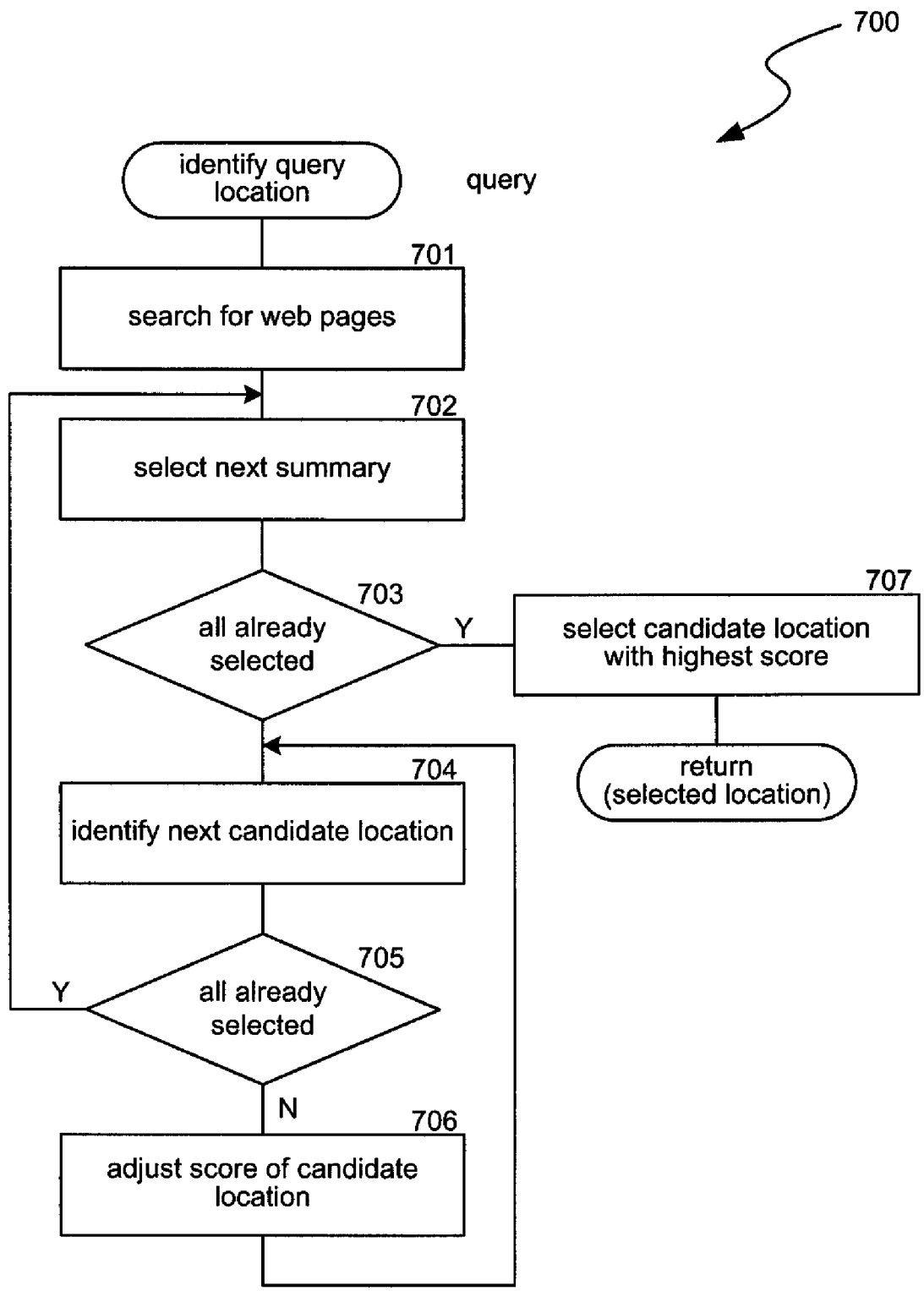
FIG. 7 is a flow diagram that illustrates the processing of the identify query location component of the advertisement system in one embodiment.

FIG. 7 is a flow diagram that illustrates the processing of the identify query location component of the advertisement system in one embodiment. The component 700 identifies query locations associated with the passed query. An example system for identifying such query locations is described in U.S. patent application Ser. No. 11/138,685 filed on May 27, 2005, now U.S. Pat. No. 7,424,472 issued on Sep. 9, 2008, entitled "Search Query Dominant Location Detection," which is hereby incorporated by reference. In block 701, the component searches for web pages that match the passed query by submitting the query to a search engine service. In block 702-706, the component loops identifying candidate locations from the summary portions of the search result and scoring the candidate locations. In block 702, the component selects the next summary of a web page in the search result. In decision block 703, if the summaries of all the web pages have already been selected, then the component continues at block 707, else the component continues at block 704. In block 704, the component identifies the next candidate location within the selected summary. In decision block 705, if all the candidate locations have already been identified, then the component loops to block 702 to select the next summary, else the component continues at block 706. In block 706, the component adjusts a score for the identified candidate location and then loops to block 704 to identify the next candidate location. The component may adjust the scores for the candidate locations by increasing the score by one for each summary in which that candidate location was identified. In block 707, the component selects the candidate locations with higher scores. The component then returns the selected locations as names of the query locations (e.g., New York City).

Figure 8:
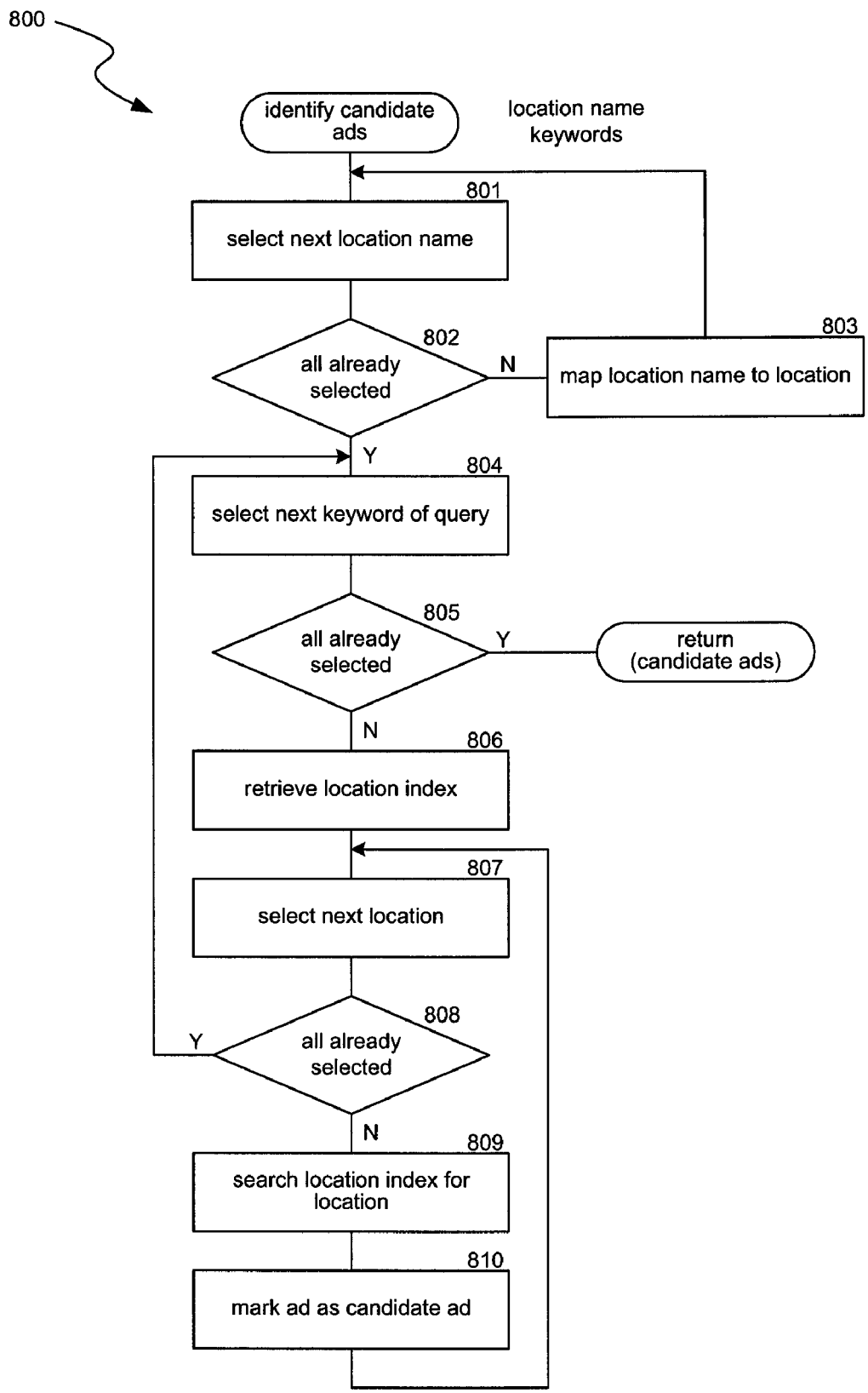
FIG. 8 is a flow diagram that illustrates the processing of the identify candidate advertisements component of the advertisement system in one embodiment.

FIG. 8 is a flow diagram that illustrates the processing of the identify candidate advertisements component of the advertisement system in one embodiment. The component 800 receives query terms and query location names and identifies candidate advertisements using a hybrid index with a keyword index as the primary index. In blocks 801-803, the component loops mapping location names to locations using a gazetteer. In block 801, the component selects the next location name. In decision block 802, if all the location names have already been selected, then the component continues at block 804, else the component continues at block 803. In block 803, the component maps the location name to the location and then loops to block 801 to select the next location name. In blocks 804-810, the component loops identifying candidate advertisements. In block 804, the component selects the next keyword or term of the query. In decision block 805, if all the keywords or terms of the query have already been selected, then the component returns, else the component continues at block 806. In block 806, the component searches the keyword index for the selected keyword and identifies the location index. In block 807, the component selects the next location of the query. In decision block 808, if all the locations have already been selected, then the component loops to block 804 to select the next keyword of the query, else the component continues at block 809. In block 809, the component searches the location index for the selected location. In block 810, if an entry corresponding to the selected location was found, then the component adds a keyword/location/advertisement reference as a candidate advertisement and then loops to block 807 to select the next location.

Figure 9:
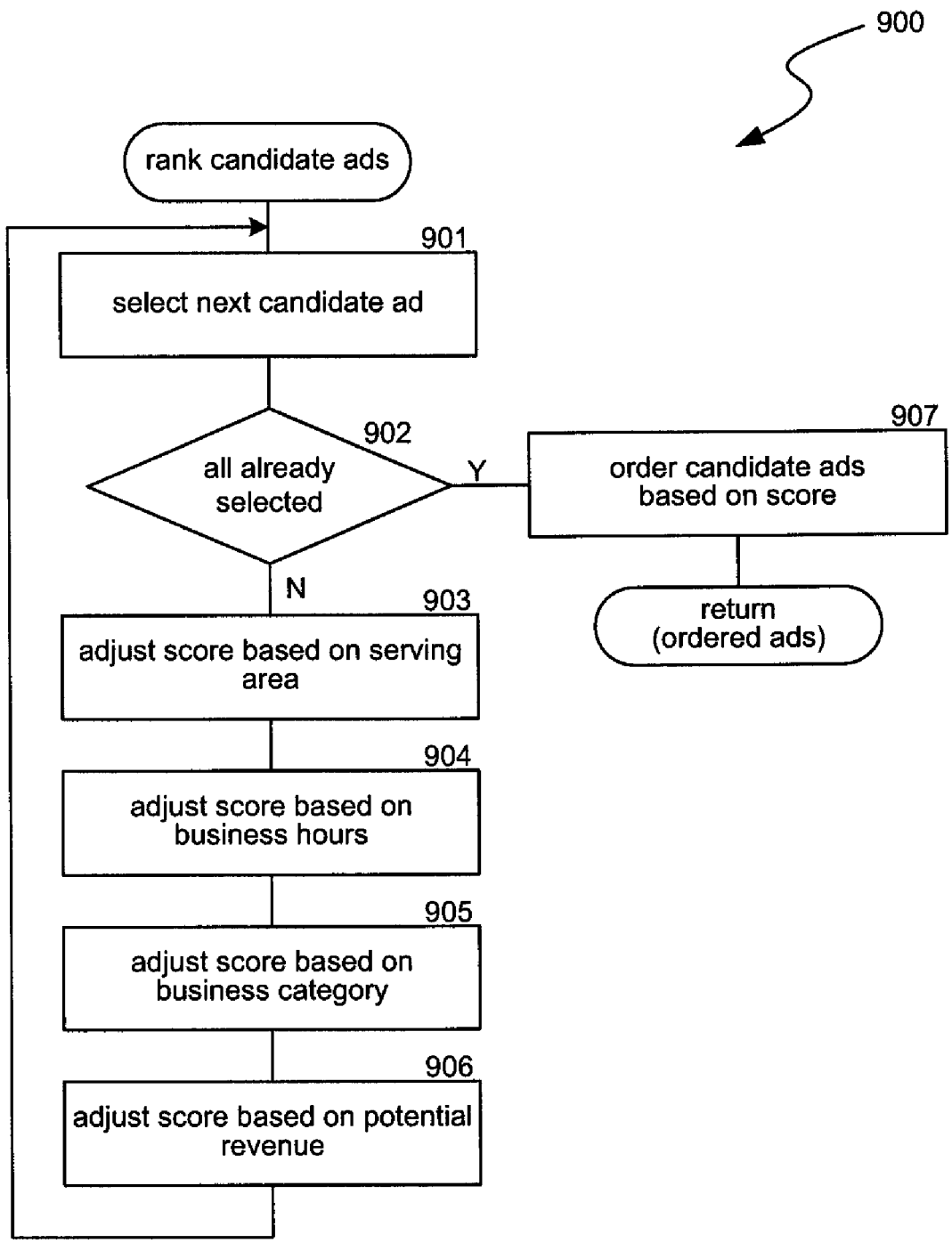
FIG. 9 is a flow diagram that illustrates the processing of the rank candidate advertisements component of the advertisement system in one embodiment.

FIG. 9 is a flow diagram that illustrates the processing of the rank candidate advertisements component of the advertisement system in one embodiment. The component 900 ranks candidate advertisements based on various criteria such as serving area and business hours. In block 901, the component selects the next candidate advertisement. In decision block 902, if all the candidate advertisements have already been selected, then the component continues at block 907, else the component continues at block 903. In block 903, the component adjusts the score for the selected candidate advertisement based on serving area. In block 904, the component adjusts the score based on business hours associated with the select candidate advertisement. For example, the component may adjust the score to a negative number if the business hours indicate that the business is closed at the current device time. In block 905, the component adjusts the score based on business category. For example, if the business category is used in the query, then the component increases the score. In block 906, the component adjusts the score based on potential revenue. For example, the component may increase the score based on the amount of money an advertiser is willing to pay to have the advertisement placed. The component then loops to block 901 to select the next candidate advertisement. In block 907, the component orders the candidate advertisements based on the calculated scores. The component then returns the ordered advertisements.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, one skilled in the art will appreciate that if too few candidate advertisements are selected for presentation, the advertisement system could relax the query used to identify candidate advertisements or expand the serving area of the advertisements. Accordingly, the invention is not limited except as by the appended claims.

We claim:

1. A computer system for providing location-based advertisements to requesting devices, comprising:

an aggregation component that collects advertisements from multiple advertisement sources, extracts data from the collected advertisements, and stores the extracted data of the advertisements in a common format;

a transformation component that transforms the extracted data of an advertisement into multiple advertisement formats that are specific to device types; and a search component that identifies advertisements that match a query and a query location associated with a requesting device, ranks the advertisements based on a location associated with the advertisements, and selects advertisement formats for the advertisements based on device type of the requesting device.

2. The computer system of claim 1 wherein the aggregation component extracts business name, business location, keywords, and business category for the advertisements.

3. The computer system of claim 1 wherein the aggregation component stores the extracted data using a hybrid index based on location and keyword.

4. The computer system of claim 1 wherein the device types are based on data protocols supported by the devices.

5. The computer system of claim 4 wherein a data protocol is selected from a group consisting of SMS, WAP, XML, MMS, and HTML.

6. The computer system of claim 1 including a content component that searches for content that matches a query received from a requesting device.

7. The computer system of claim 1 wherein the search component ranks advertisements based on serving area associated with the advertisements.

8. The computer system of claim 7 wherein advertisements whose serving areas encompass the location of the requesting device are ranked higher than other advertisements.

9. The computer system of claim 8 wherein advertisements whose serving areas do not encompass the location of the requesting device are ranked based on distance between the location of the requesting device and the serving area.

10. The computer system of claim 1 wherein the aggregation component extracts business name, business location, keywords, and business category for each advertisement; wherein the aggregation component stores the extracted data using a hybrid index based on location and keyword; wherein the device types are based on data protocols supported by the devices; and wherein the search component ranks advertisements based on serving area associated with the advertisements.

11. A computer-readable medium containing instructions for controlling a computing system to select advertisements for requesting devices, by a method comprising:

providing advertisements from multiple advertisement sources;

extracting a common set of data from the collected advertisements;

transforming the extracted data of each advertisement into multiple advertisement formats that are specific to device types;

receiving a query from a requesting device;

identifying a location associated with the query;

identifying candidate advertisements that match the query and identified location;

ranking the candidate advertisements based on the identified location and a location associated with the advertisements; and selecting, for each advertisement, an advertisement format based on device type of the requesting device.

12. The computer-readable medium of claim 11 wherein the identified location is derived from the query.

13. The computer-readable medium of claim 11 wherein the identified location is based on the location of the requesting device.

14. The computer-readable medium of claim 11 wherein the ranking of advertisements is based on serving areas associated with the advertisements.

15. The computer-readable medium of claim 11 wherein the ranking is based on a map area being displayed on the requesting device.

16. The computer-readable medium of claim 11 including storing the extracted data using a hybrid index based on location and keyword.

17. The computer-readable medium of claim 11 wherein the identified location is derived from the query, wherein the ranking of advertisements is based on serving areas associated with the advertisements, and wherein the extracted data is stored using a hybrid index based on location and keyword.

18. A computer system for providing advertisements to requesting devices, comprising:

an aggregation component that extracts data from advertisements and that generates an index of the advertisements based on location and keyword;

a transformation component that transforms the extracted data of an advertisement into multiple advertisement formats that are specific to device types; and a search component that identifies from the index advertisements that match a query and a location, ranks the identified advertisements based on a location associated with the advertisements, and selects for each identified advertisement an advertisement format based on device type of the requesting device.

19. The computer system of claim 18 wherein the generated index is a hybrid index.

20. The computer system of claim 18 wherein the search component ranks advertisements based on serving area associated with the advertisements.

* * * * *

UNITED STATES PATENT AND TRADEMARK OFFICE
CERTIFICATE OF CORRECTION

PATENT NO. : 7,650,431 B2
APPLICATION NO. : 11/467771
DATED : January 19, 2010
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this

Twenty-third Day of November, 2010

David J. Kappos
*Director of the United States Patent and Trademark Office*